US012723423B1

(12) United States Patent
Zhao et al.

(10) Patent No.: US 12,723,423 B1
(45) Date of Patent: Sep. 1, 2026

(54) POOL SKIMMER

(71) Applicant: SICHUAN COOTWAY TECHNOLOGY CO., LTD., Deyang (CN)

(72) Inventors: Chunhai Zhao, Deyang (CN); Daiquan Li, Deyang (CN)

(73) Assignee: SICHUAN COOTWAY TECHNOLOGY CO., LTD., Deyang (CN)

( * ) Notice: Subject to any disclaimer, the term of this patent is extended or adjusted under 35 U.S.C. 154(b) by 0 days.

(21) Appl. No.: 19/373,644

(22) Filed: Oct. 29, 2025

(30) Foreign Application Priority Data

Oct. 17, 2025 (CN) ........................ 202522198934.7

(51) Int. Cl.

*E04H 4/12* (2006.01)
*B01D 29/35* (2006.01)
*B01D 29/90* (2006.01)
*C02F 1/00* (2023.01)
*C02F 103/42* (2006.01)

(52) U.S. Cl.

CPC ........... *E04H 4/1218* (2013.01); *B01D 29/35* (2013.01); *B01D 29/90* (2013.01); *C02F 1/001* (2013.01); *C02F 2103/42* (2013.01); *C02F 2201/004* (2013.01); *C02F 2209/02* (2013.01); *C02F 2301/026* (2013.01)

(58) Field of Classification Search

CPC ..... E04H 4/1218; E04H 4/1272; B01D 29/35; B01D 29/90; C02F 1/001; C02F 2103/42; C02F 2201/004; C02F 2209/02; C02F 2301/026

USPC ........................................................... 210/85

See application file for complete search history.

(56) References Cited

U.S. PATENT DOCUMENTS 4,212,740 A * 7/1980 Greene ................. E04H 4/1272 210/242.1
5,596,773 A * 1/1997 Cueman .................... E04H 4/12 4/496
6,716,342 B1 * 4/2004 Tilsner .................. E04H 4/1272 210/232
9,945,141 B2 4/2018 Goettl
10,378,228 B2 8/2019 Huang et al.
11,332,950 B2 * 5/2022 Schmidt ................ E04H 4/1263
11,946,279 B2 4/2024 Afshar
2019/0136557 A1 * 5/2019 Jensen .................. E04H 4/1272

FOREIGN PATENT DOCUMENTS

CN 113945918 A * 1/2022 ............. G01S 13/58

* cited by examiner

*Primary Examiner* — Bobby Ramdhanie
*Assistant Examiner* — William Addison Geisbert

(57) ABSTRACT

A swimming pool skimmer includes a hanging assembly and a filter assembly. The hanging assembly includes a top portion and a side portion. The first end of the side portion is connected to the top portion, and the second end of the side portion is provided with a sliding rod. The filter assembly is connected to the sliding rod and can be selectively adjusted in position along the longitudinal direction of the sliding rod. The hanging assembly is provided with a circuit board and a display screen, a battery, and a first temperature sensor. The first temperature sensor is arranged on the sliding rod. The first temperature sensor is configured to detect the water temperature in the swimming pool.

3 Claims, 15 Drawing Sheets

2042
203
205
201
D 80
71
61
104
204
20

80
72
62
104
204
20

POOL SKIMMER

RELATED APPLICATIONS

The present patent document claims the benefit of priority to Chinese Patent Application No. 202522198934.7, filed Oct. 17, 2025, the entire content of which is incorporated herein by reference.

BACKGROUND

1. Technical Field

The present disclosure relates to pool cleaning equipment, and in particular to a pool skimmer.

2. Background Information

As a type of pool cleaning equipment, a pool skimmer is primarily configured to remove floating debris from the water surface, such as fallen leaves and dust.

BRIEF SUMMARY

The first aspect of the embodiments of the present disclosure provides a pool skimmer including a hanging assembly and a filter assembly. The hanging assembly includes a top portion and a side portion, a first end of the side portion is connected to the top portion, and a second end of the side portion is provided with a sliding rod, the filter assembly is connected to the sliding rod and is configured to be adjusted in position along a longitudinal direction of the sliding rod. The hanging assembly is provided with a circuit board, a display screen, a battery, and a first temperature sensor; the display screen, the battery, and a first temperature sensor are electrically connected to the circuit board. The sliding rod has a first end facing away from the side portion, the first temperature sensor is provided at the first end of the sliding rod, and the first temperature sensor is configured to detect a water temperature of a swimming pool.

BRIEF DESCRIPTION OF THE DRAWINGS

The drawings in the specification, which constitute a part of the present disclosure, are configured to provide further understanding of the present disclosure. The illustrative embodiments of the present disclosure and their descriptions are for explanation purposes and do not constitute improper limitations on the present disclosure.

DETAILED DESCRIPTION OF THE DRAWINGS AND THE PRESENTLY PREFERRED EMBODIMENTS

Figure 1:
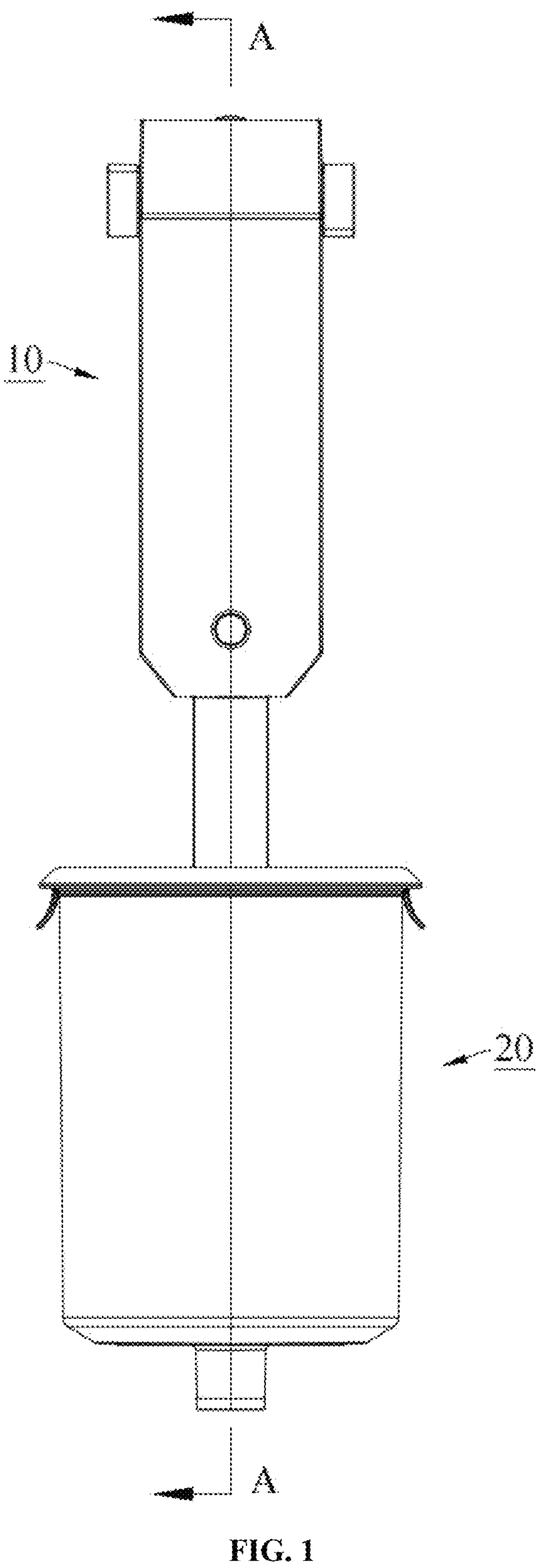
FIG. 1 is a front perspective view of a pool skimmer according to some embodiments of the present disclosure.

The present disclosure will be described in detail below with reference to the accompanying drawings and in conjunction with examples. Each example is provided by way of explanation of the present disclosure and is not intended to limit the present disclosure. Indeed, those skilled in the art will appreciate that modifications and variations may be made herein without departing from the scope or spirit of the present disclosure. For example, a feature illustrated or described as part of some embodiments may be used in another embodiment to produce yet another embodiment. Therefore, it is intended that the present disclosure encompasses such modifications and variations as come within the scope of the appended claims and their equivalents.

In the description of the present disclosure, terms such as "longitudinal," "transverse," "upper," "lower," "front," "rear," "left," "right," "vertical," "horizontal," "top," and "bottom" indicate orientations or positional relationships based on the orientations or positional relationships shown in the accompanying drawings. These terms are provided solely for ease of description and do not require that the present disclosure be constructed or operated in a specific orientation. Therefore, they should not be construed as limiting the present disclosure. The terms "connected," "connection," and "arranged" used in the present disclosure should be interpreted broadly. For example, they can refer to fixed or detachable connections; direct or indirect connections through intermediate components; wired electrical connections, radio connections, or wireless communication signal connections. Those skilled in the art will understand the specific meanings of these terms based on the specific circumstances.

The accompanying drawings illustrate one or more examples of the present disclosure. The detailed description uses numbers and letters to refer to features in the drawings. Like or similar numbers in the drawings and description have been configured to refer to like or similar parts of the present disclosure. As used herein, the terms "first," "second," and "third" are used interchangeably to distinguish one component from another and are not intended to indicate the location or importance of individual components.

As shown in FIGS. 1 to 4, according to some embodiments of the present disclosure, a pool skimmer is provided, including a mounting assembly 10 and a filter assembly 20. In some embodiments, the mounting assembly 10 is configured to mount the pool skimmer on the sidewall of a pool, while the filter assembly 20 extends into the water, effectively collecting and filtering floating debris on the water surface.

The mounting assembly 10 includes a top portion 101 and a side portion 102. The first end of the top portion 101 is connected to the first end of the side portion 102, and the top portion 101 and the side portion 102 form a substantially 90-degree angle. The filter assembly 20 is connected to the second end of the side portion 102. The top portion 101 and the side portion 102 can be a single-piece structure, as shown in the figures, or they can be disassembled or assembled using screws, snaps, adhesives, or other means to facilitate installation and subsequent maintenance.

The pool skimmer integrates water temperature monitoring and real-time display functions to enhance product intelligence and user experience. The pool skimmer also includes at least one temperature sensor, a circuit board 1031 and a display screen 1032 mounted on the top portion 101, and a battery 1038. The circuit board 1031 includes temperature monitoring and display circuitry. The display screen 1032, the at least one temperature sensor, and the battery 1038 are all electrically connected to the circuit board 1031. The at least one temperature sensor includes a first temperature sensor 1035, which is mounted on the second end of the side portion 102 and electrically connected to the circuit board 1031 via a wire.

The display screen 1032 is configured to display the temperature collected by the at least one temperature sensor. During use, the pool skimmer's mounting assembly 10 is mounted on the sidewall of the pool, ensuring that the first temperature sensor 1035, mounted on the side portion 102, is fully immersed in the pool water. In this state, the circuitry on the circuit board 1031 obtains the water temperature measured by the first temperature sensor 1035 in real time, and the current pool water temperature can be viewed at any time on the display screen 1032, allowing users to monitor the pool water temperature without the need for additional temperature measurement tools.

Figure 2:
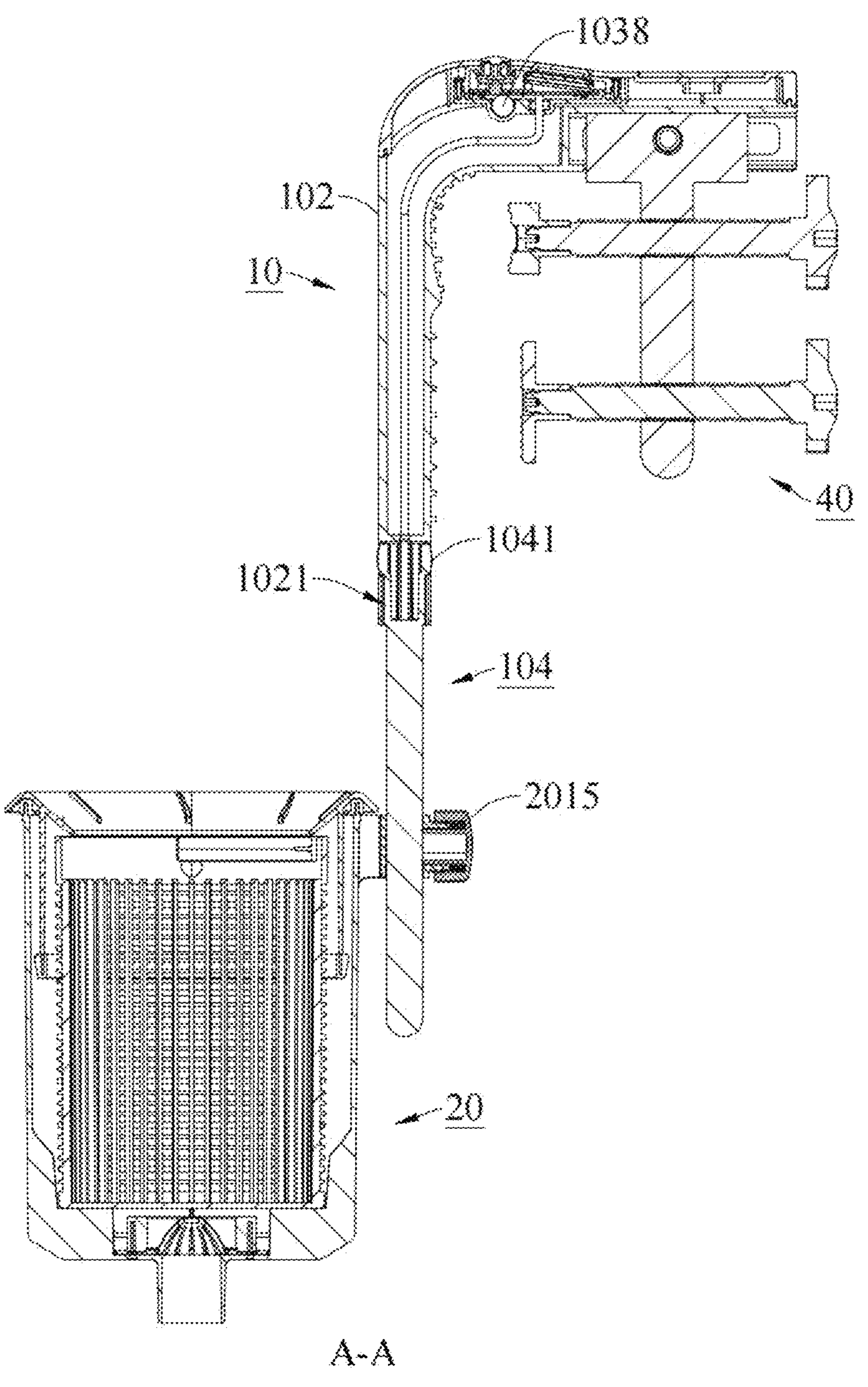
FIG. 2 is a cross-sectional view taken along line AA in FIG. 1.
Figure 4:
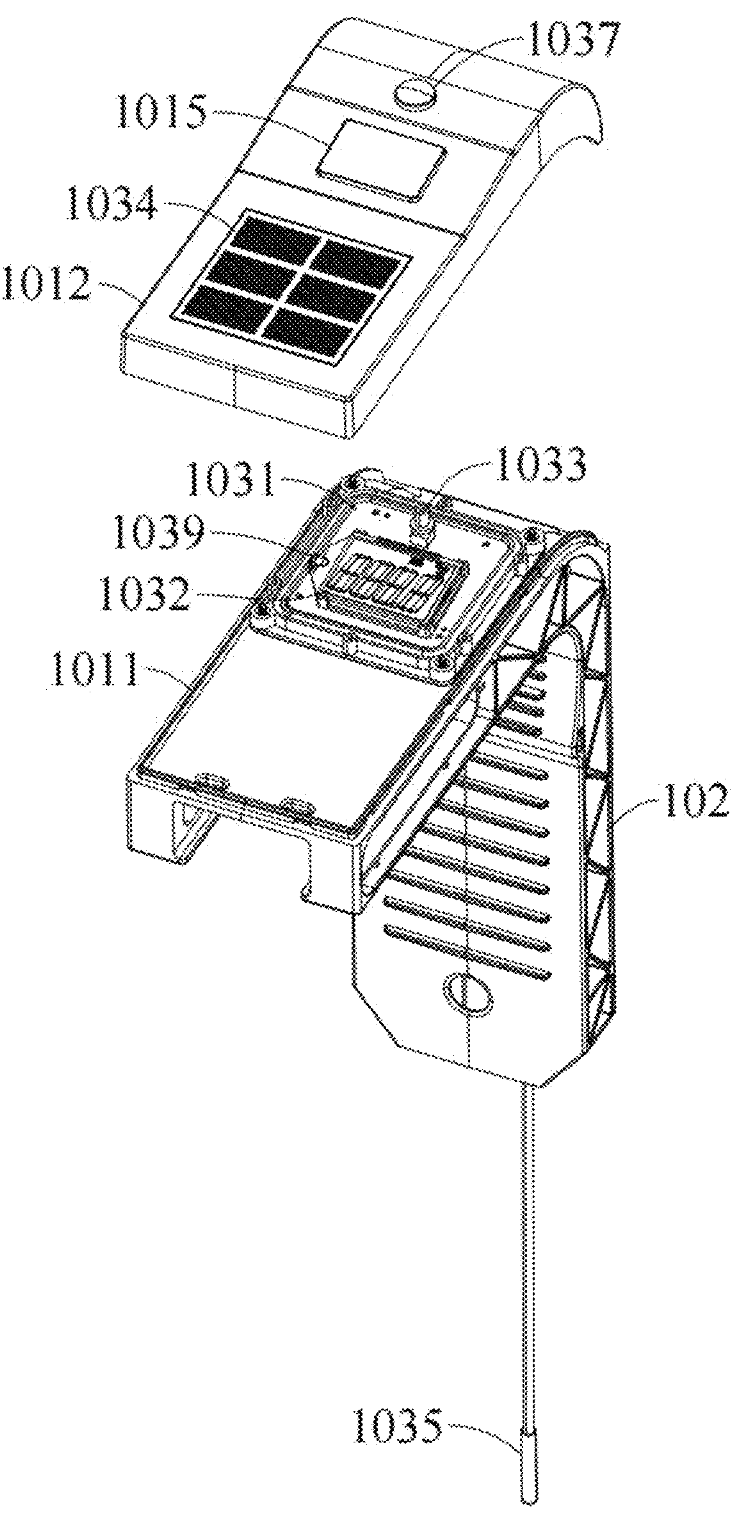
FIG. 4 is a perspective view of a mounting assembly according to some embodiments of the present disclosure, illustrating the structure of the electronic components.

As shown in FIGS. 2 and 4, the top portion 101 includes an upper housing 1012 and a lower housing 1011. The upper housing 1012 has a window 1015 aligned with the display screen 1032, allowing the user to clearly read the displayed content through the window 1015.

The first end of the side portion 102 is connected to the lower housing 1011. The circuit board 1031, the display screen 1032, and the battery are located between the upper housing 1012 and the lower housing 1011. The circuit board 1031 is fixed to the lower housing 1011, the display screen 1032 is mounted on one side of the circuit board 1031 facing the upper housing 1012, and the battery 1038 is located on another side of the circuit board 1031 facing away from the upper housing 1012.

In some embodiments, the battery 1038 includes a replaceable disposable battery or a rechargeable battery.

In some embodiments, the circuit board 1031 also includes a charging circuit that can be connected to an external power adapter to charge the rechargeable battery.

In some embodiments, as shown in FIG. 4, the pool skimmer also includes a solar panel 1034 mounted on the outside of the upper housing 1012. The solar panel 1034 is electrically connected to the circuit board 1031 and can charge the rechargeable battery. This solar power solution extends the device's battery life and reduces maintenance costs.

In some embodiments, at least one button is electrically connected to the circuit board 1031. The at least one button includes a temperature scale button 1033 as shown in FIG. 4. The temperature display in the present disclosure supports two temperature units: Celsius and Fahrenheit, to accommodate different user preferences. Triggering the temperature scale button 1033 switches the temperature unit and the corresponding temperature value on the display screen 1032. In some embodiments, the upper housing 1012 also includes a button 1037 corresponding to the temperature scale button 1033, and the button 1037 is aligned with the temperature scale button 1033.

In some embodiments, as shown in FIG. 4, to facilitate viewing of content on display screen 1032 at night, the display screen 1032 is arranged with a backlight 1039 mounted on circuit board 1031. The backlight 1039 facilitates information on the display screen clearly visible at night or in low light, enhancing the device's usability day and night. The display screen 1032 may have a built-in backlight function, which is not a specific limitation here. Furthermore, regarding control of the backlight 1039, an electrically connected photosensor (such as a photoresistor) may be mounted on circuit board 1031 to sense ambient light intensity and automatically turn the backlight 1039 on and off at night or in low light. Alternatively, on/off times may be set (manually or pre-set) on a chip on the circuit board 1031 to manage the duration of backlight 1039's on-state. Alternatively, the at least one button may include a light button, and the light button may be configured to control the on/off of the backlight 1039. Alternatively, the backlight 1039 may be kept on at all times.

In some embodiments, the circuit board 1031 is also electrically connected to a second temperature sensor 1036 for obtaining ambient temperature. The display screen 1032 also displays the temperature value collected by the second temperature sensor 1036. Compared to outdoor temperatures reported by a city or region, the temperature obtained by the second temperature sensor 1036 is closer to the ambient temperature of the swimming pool.

Figure 3:
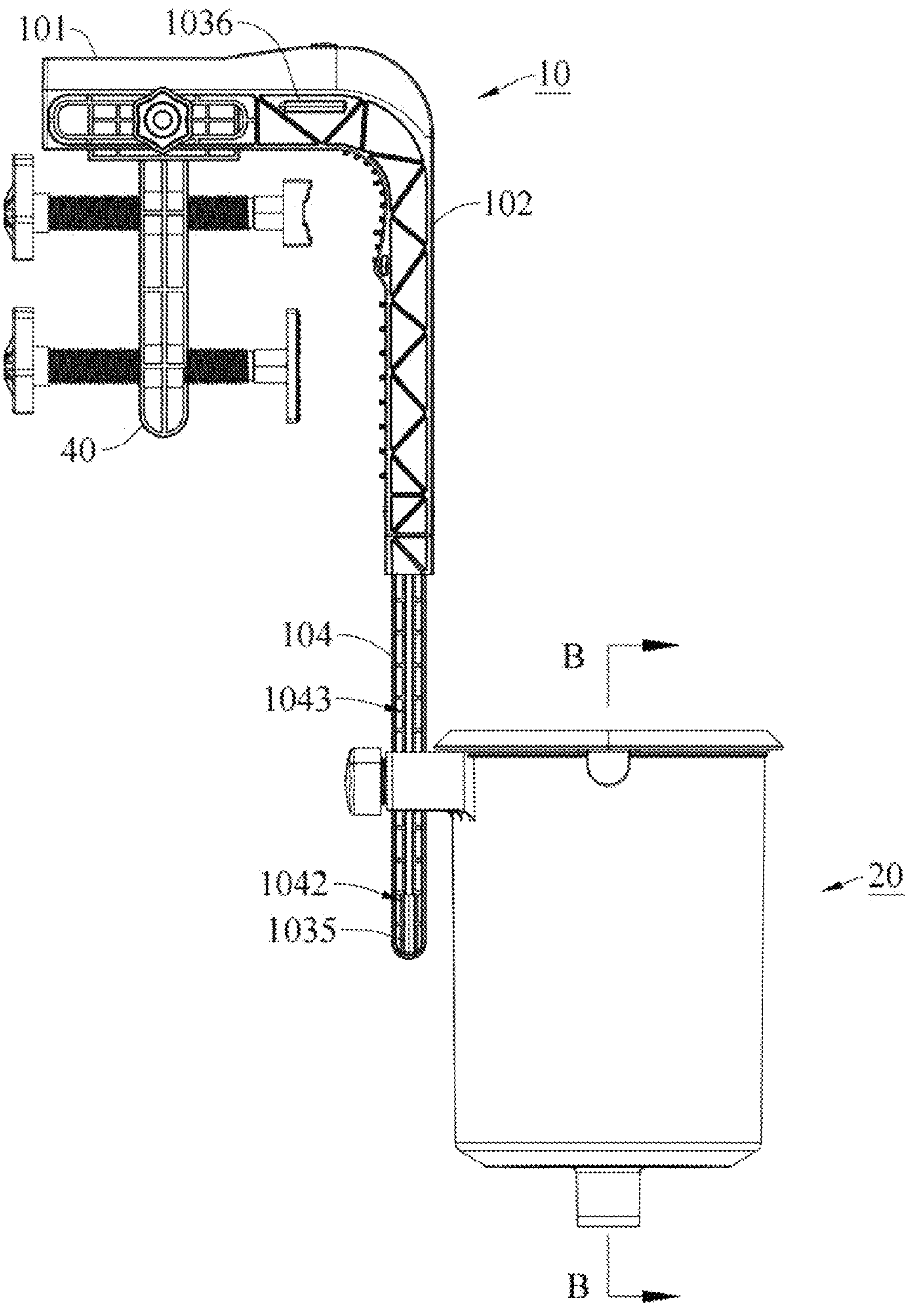
FIG. 3 is a right perspective view of a pool skimmer according to some embodiments of the present disclosure.
Figure 8:
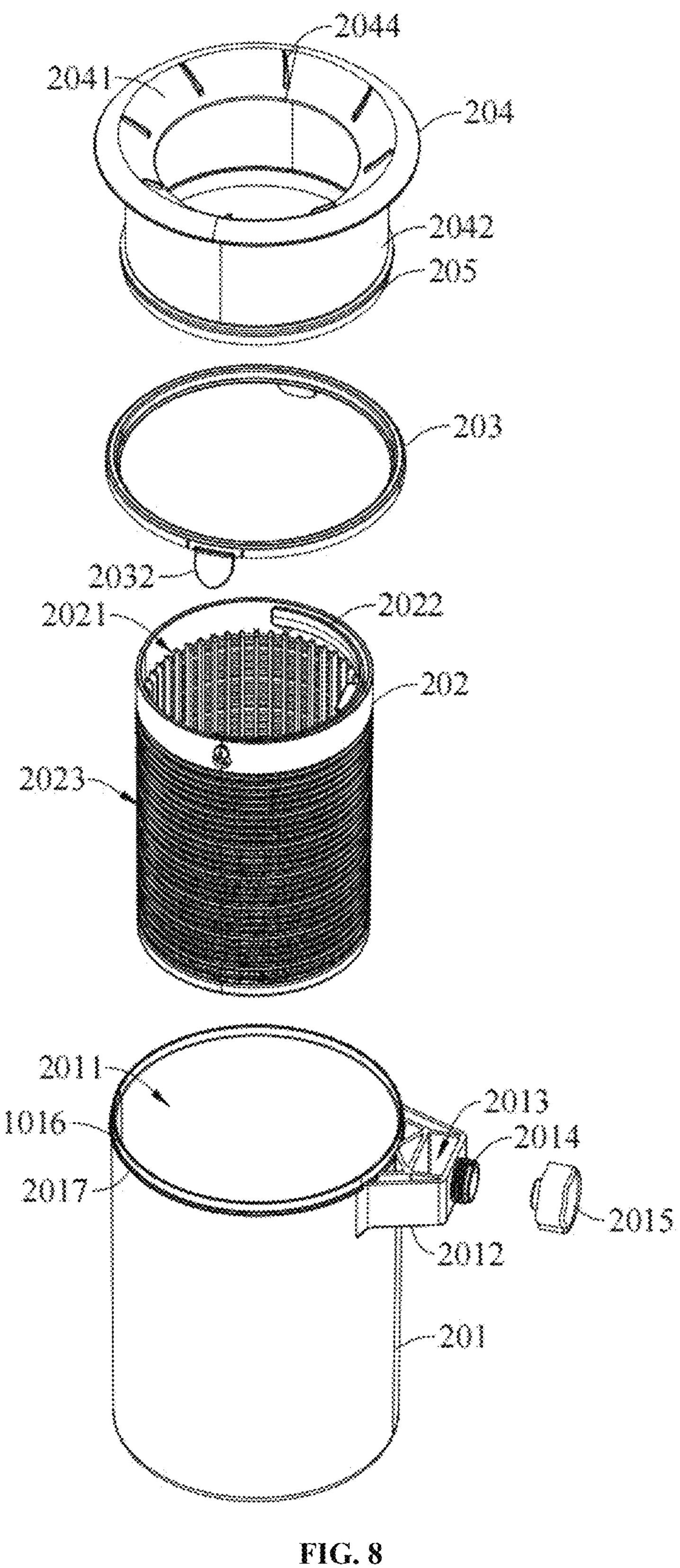
FIG. 8 is an exploded view of a filter assembly according to some embodiments of the present disclosure.
Figure 9:
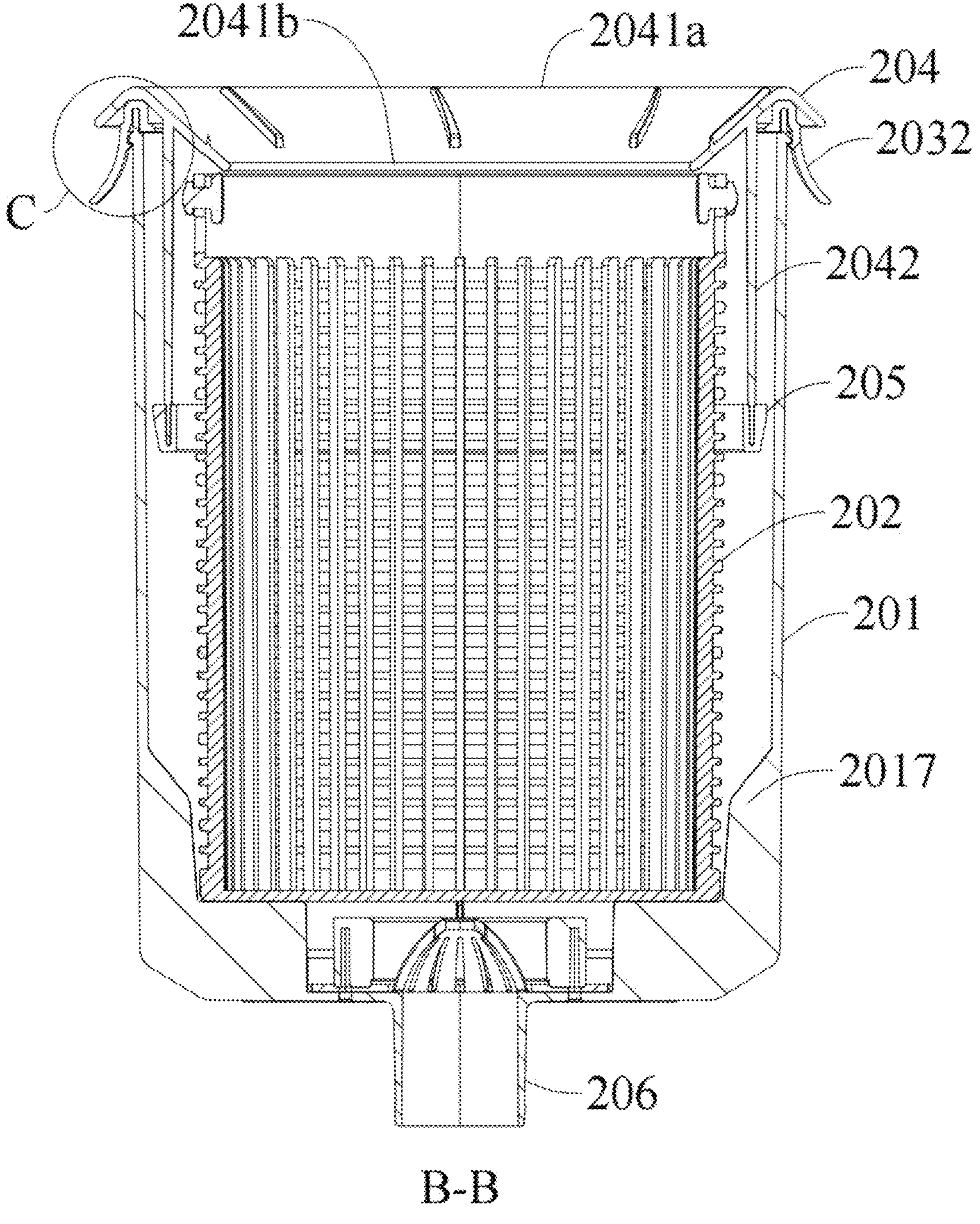
FIG. 9 is a cross-sectional view taken along line BB in FIG. 3.

The amount of water in a swimming pool affects the water level, and the upper edge 2016 of the filter assembly 20 needs to remain substantially flush with the water surface. Therefore, in some embodiments, as shown in FIGS. 2 and 3, the side portion 102 of the mounting assembly 10 is provided with a sliding rod 104. The filter assembly 20 is mounted on the sliding rod 104 and is adjustable along its longitudinal direction. This allows the position of the filter assembly 20 on the sliding rod 104 to be adjusted according to the pool water level, ensuring that the upper edge 2016 of the filter assembly 20 remains substantially flush with the pool water surface after the pool skimmer is installed. As shown in FIGS. 2 and 8, the outer side of the filter assembly 20 is provided with a connecting end 2012, which is defined with a sliding hole 2013. The sliding rod 104 can be selectively inserted into the sliding hole 2013 and slidably connected thereto. The connecting end 2012 is provided with an externally threaded tube 2014, which is connected to the sliding hole 2013. The externally threaded tube 2014 is connected to a knob 2015 for tightening. The knob 2015 has internal threads and an inner core that threadedly mates with the externally threaded tube 2014. When the knob 2015 is threadedly connected to the externally threaded tube 2014, the inner core of the knob 2015 can be inserted into the externally threaded tube 2014. Turning the knob 2015 causes the end of the inner core to approach the sliding hole 2013 and abut against the sliding rod 104 in the sliding hole 2013, thereby securing the filter assembly 20 to the hanging assembly 10. The above structure allows the filter assembly 20 to be selectively adjusted along the longitudinal direction of the sliding rod, ensuring it is always in the optimal working position, improving skimming efficiency and equipment usability.

In addition, in some embodiments, the sidewall of the connecting end 2012 is defined with a through hole with internal threads, and the through hole communicates with the sliding hole 2013. The knob includes an inner core with external threads for threadedly connected to the through hole. Turning the knob causes the end of the inner core to approach the sliding hole 2013 and abut against the sliding rod 104 within the sliding hole 2013, thus securing the filter assembly 20 to the hanging assembly 10. In some embodiments, other securing means are also possible and are not specifically limited here.

Figure 5:
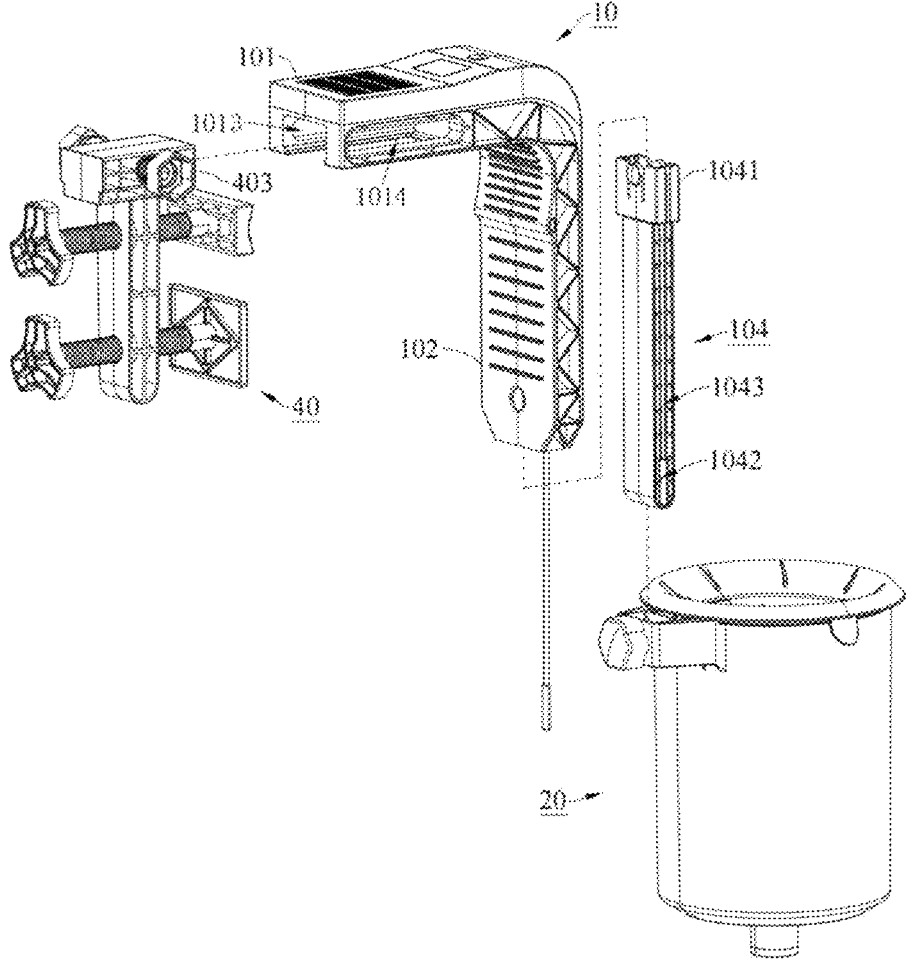
FIG. 5 is an exploded view of a pool skimmer according to some embodiments of the present disclosure.

As shown in FIGS. 2 and 5, in some embodiments, the sliding rod 104 is detachably connected to the side portion 102 of the hanging assembly 10. This allows for different lengths or types of sliding rods 104 to be used depending on the needs or different models of pool skimmers. In some embodiments, the second end of the side portion 102 is defined with a socket 1021. The first end of the sliding rod 104 is an insertion end 1041. The insertion end 1041 of the sliding rod 104 can be selectively inserted into and interlocked with the socket 1021 to secure the sliding rod 104 to the side portion 102 of the hanging assembly 10.

As shown in FIGS. 3 and 5, in some embodiments, the second end of the sliding rod 104 is defined with a component compartment 1042 for accommodating a first temperature sensor 1035. The side of the sliding rod 104 is defined with a wire slot 1043 for accommodating wires that electrically connect the first temperature sensor 1035 to the circuit board 1031.

Figure 6:
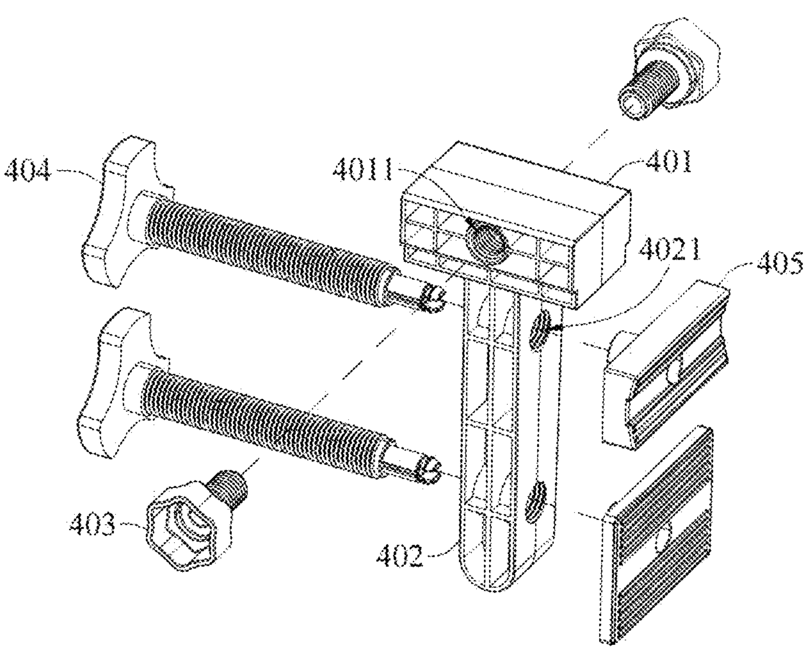
FIG. 6 is a perspective view of a first fixing assembly according to some embodiments of the present disclosure.

As shown in FIGS. 5 and 6, in some embodiments, the pool skimmer further includes a first fixing assembly 40, which includes a slider 401 and a support rod 402. The slider 401 is fixedly connected to the support rod 402, and the angle between the slider 401 and the support rod 402 is approximately 90 degrees. The slider 401 defines a first threaded hole 4011 on both its first and second sides which are oppositely oriented. The axial direction of the first threaded hole 4011 is perpendicular to the longitudinal direction of the slider 401 and the longitudinal direction of the support rod 402. The support rod 402 defines at least one second threaded hole 4021, which extends through the support rod 402 and has an axial direction approximately aligned with the longitudinal direction of the slider 401. The top portion 101 of the hanging assembly 10 defines a sliding groove 1013, which extends along the longitudinal direction of the top portion 101 and is approximately perpendicular to the longitudinal direction of the side portion 102. The first and second sidewalls of the sliding groove 1013 are each defined with slots 1014 extending along the longitudinal direction of the top portion 101, with the first and second sidewalls located on opposite sides of the top portion 101. The slider 401 can selectively slide within the sliding groove 1013 to adjust the distance between the support rod 402 and the pool sidewall.

The first fixing assembly 40 also includes a first fastener 403 having a handle and a screw. The screw of the first fastener 403 passes through the slot 1014 and connects with the first threaded hole 4011 of the slider 401. Rotating the first fastener 403 causes the handle to abut against the top portion 101, securing the slider 401 to the top portion 101 of the hanging assembly 10.

The first fixing assembly 40 also includes a second fastener 404 having a handle and a screw, with the handle located at the first end of the screw. The screw of the second fastener 404 is threadedly engaged with the second threaded hole 4021. The second end of the screw can be inserted into the second threaded hole 4021 from the side facing away from the side portion 102 and can be exited from the second threaded hole 4021 from the side facing the side portion 102. Continuing to rotate the second fastener 404 can move the second end of the screw toward or away from the side portion 102 of the hanging assembly 10.

To secure the pool skimmer, hang the mounting assembly 10 in the desired location on the pool, move the slider 401 to adjust the distance between the support rod 402 and the pool sidewall, and then tighten the slider 401. Then, rotate the second fastener 404 so that its threaded rod approaches the pool sidewall until the second end of the threaded rod abuts and secures the pool skimmer.

In some embodiments, the second end of the threaded rod of the second fastener 404 is rotatably connected to an abutment plate 405. The abutment plate 405 increases the contact area between the second fastener 404 and the pool sidewall, reducing damage to the pool due to excessive force during tightening. Furthermore, in some embodiments, the abutment plate 405 facing the side portion 102 and the side portion 102 facing the abutment plate 405 are both provided with anti-slip ridges. These ridges effectively increase friction on the contact surface, preventing the device from shifting due to water impact or vibration, thereby enhancing the stability of the pool skimmer secured to the pool.

Figure 7:
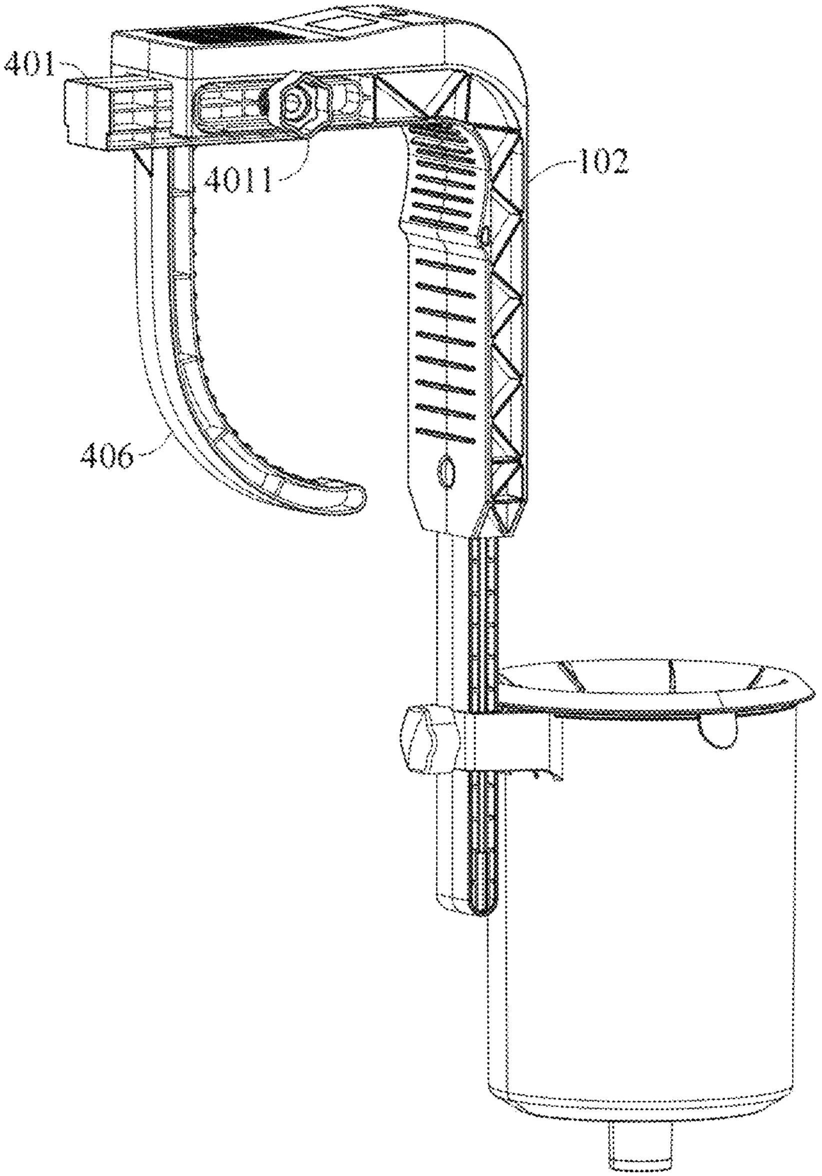
FIG. 7 is a perspective view of a second fixing assembly according to some embodiments of the present disclosure.

In some embodiments, as shown in FIG. 7, the present disclosure provides a second fixing assembly that replaces the support rod 402 and the second fastener 404 in the first fixing assembly 40 with a hook 406. The end of the hook 406 facing away from the slider 401 is bent toward the side portion 102, so that the top portion 101, side portion 102, and hook 406 of the hanging assembly 10 together form a snap-fit structure. During use, the hanging assembly 10 can be hung in a suitable location in the swimming pool, and the slider 401 can be moved to adjust the distance between the hook 406 and the pool wall. Once the hook 406 is securely attached to the pool wall, the slider 401 can be locked with the first fastener 403, completing the quick installation and securement of the pool skimmer.

As shown in FIGS. 8 to 11, the present disclosure also provides a filter assembly 20 including a basket 201 defining a receiving chamber 2011, with the aforementioned connection end 2012 disposed on the outside of the basket 201. The basket 201 has a water outlet at its bottom, which communicates with the receiving chamber 2011. In some embodiments, the water outlet is a water outlet pipe 206. The receiving chamber 2011 defines an upper opening and houses a filter. In some embodiments, the filter is a filtration cylinder 202, which includes a filtration chamber 2021. The sidewalls and bottom of the filtration cylinder 202 are each defined with a plurality of water-permeable holes 2023, which filter out floating debris and particulate matter from the pool water. A rotatably connected handle 2022 is provided at the top of the filtration cylinder 202. Above the receiving chamber 2011 is a float 204, which includes a funnel-shaped inlet pipe 2041 and a body 2042. The funnel-shaped inlet pipe 2041 not only optimizes the water flow path and reduces resistance, but also increases the local flow velocity through its gradually decreasing diameter, thereby enhancing suction and improving the efficiency of collecting floating debris. The inlet pipe 2041 includes a first end **2041*a* facing away from the basket 201 and a second end 2041*b* facing in the opposite direction. The inlet pipe 2041 smoothly extends downward from the first end 2041*a* to the second end 2041*b***, and the diameter gradually decreases.

The body 2042 is located on the side of the inlet pipe 2041 facing the basket 201 and extends downward from the middle between the first end 2041*a* and the second end 2041*b* of the inlet pipe 2041. The body 2042 of the float 204 is inserted between the outer wall of the filtration cylinder 202 and the inner wall of the basket 201 and is movable along the axial direction of the basket 201.

Figure 12:
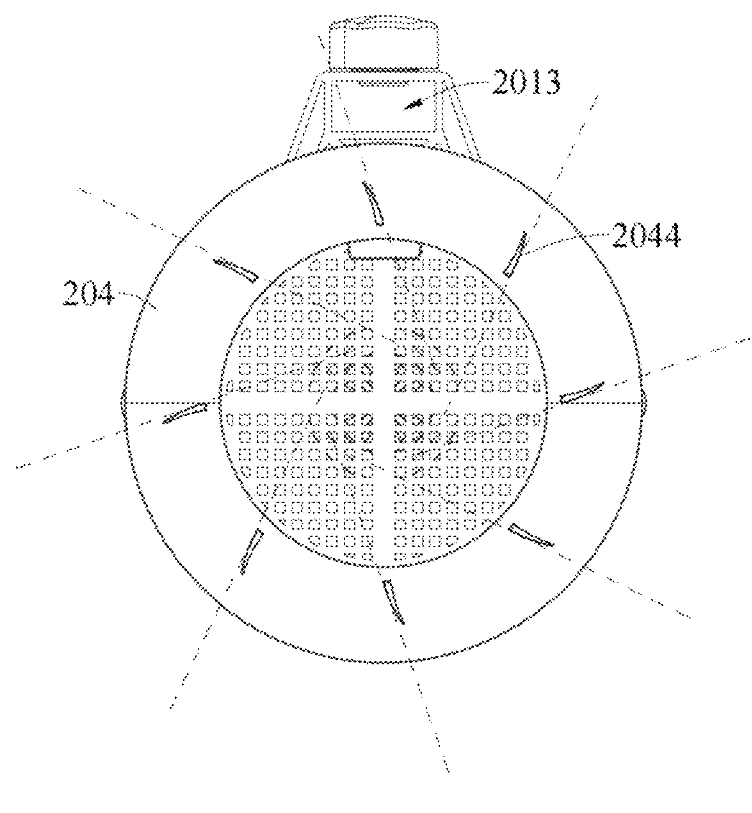
FIG. 12 is a top-down perspective view of a filter assembly according to some embodiments of the present disclosure, illustrating the arrangement of the multiple guide strips and the vortex formed by the pool water flowing into the inlet pipe under the guidance of the multiple guide strips.

To enhance filtration efficiency, in some embodiments, as shown in FIG. 12, the inlet pipe 2041 is arranged with a plurality of upwardly projecting, uniformly inclined guide strips 2044. These guide strips 2044 are evenly distributed along the circumference of the inlet pipe 2041 and extend tangentially from the radial direction, generating a tangential velocity component in the water flow entering the float 204. These guide strips 2044 are configured to guide the pool water flowing through the inlet pipe 2041 into a vortex, thereby enhancing the suction of the filter assembly 20. The vortex flow field formed by the plurality of guide strips 2044 effectively separates and concentrates impurities, preventing floating debris from escaping, significantly improving the skimming capability of the filter assembly 20.

In some embodiments, the filter includes filter cotton, which is laid at the bottom of the receiving chamber 2011 and can also achieve a filtering effect. Using replaceable filter cotton as the filter medium enhances the filter assembly 20's ability to capture fine contaminants. The filter cotton effectively intercepts fine particles, oil, and suspended impurities, preventing them from entering the water pump system to cause blockage or damage. Users can regularly replace or clean the filter cotton according to water quality conditions, achieving flexible adaptation to different filtration accuracy requirements.

Figure 10:
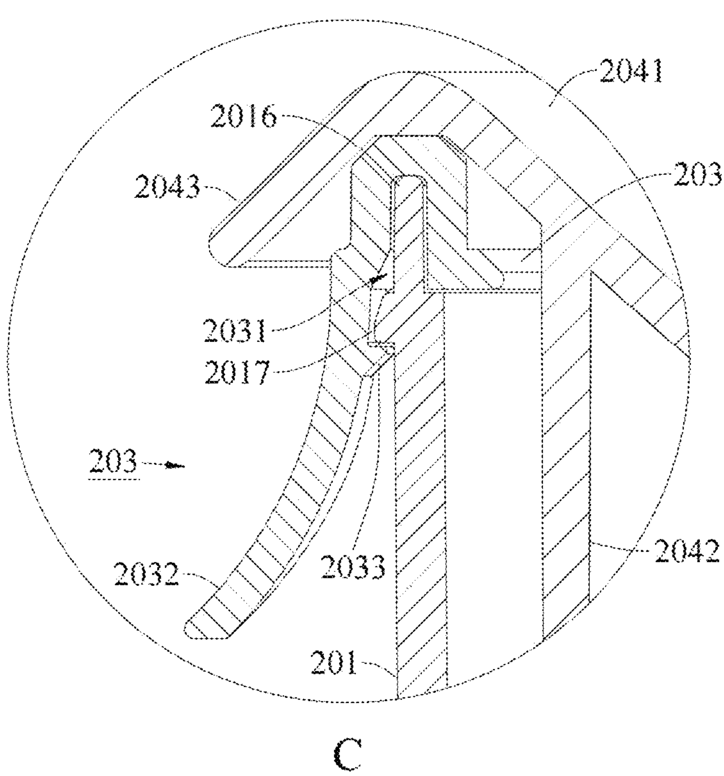
FIG. 10 is an enlarged partial view of area C in FIG. 9.
Figure 11:
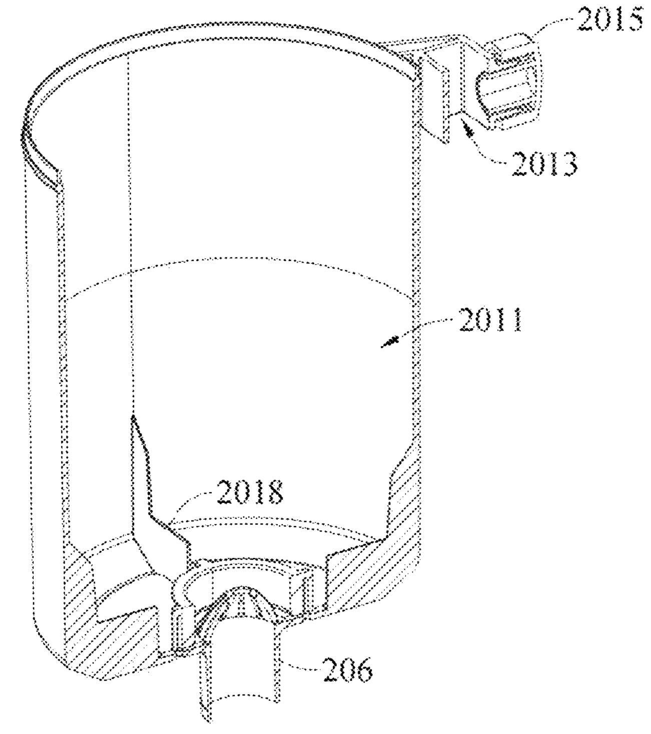
FIG. 11 is a cross-sectional view of a basket in FIG. 2.

As illustrated in FIGS. 8 and 10, a removable first retaining ring 203 is mounted on the upper edge 2016 of the basket 201. A ring groove 2031 is formed on the side of the first retaining ring 203 facing the basket 201, and the ring groove 2031 engages with the upper edge 2016 of the basket 201. A second retaining ring 205 is provided at the end of the body 2042 of the float 204. The outer diameter of the second retaining ring 205 is smaller than the inner diameter of the receiving chamber 2011 of the basket 201, but greater than the inner diameter of the first retaining ring 203. The inner diameter of the first retaining ring 203 is greater than the outer diameter of the cylinder body 2042. The float 204 can move axially along the basket 201, but is restrained by the first retaining ring 203 and cannot escape from the basket 201. The cooperation between the first retaining ring 203 and the second retaining ring 205 ensures reliable axial positioning of the float 204, ensuring its ability to float with the water level while preventing it from falling due to water impact.

In some embodiments, the inner wall of the ring groove 2031 is connected to the upper edge 2016 of the basket 201 using an interference fit, firmly securing the first retaining ring 203 to the basket 201 and preventing it from loosening or falling off. Alternatively, in some embodiments, a third retaining ring 2017 is provided on the outer wall of the basket 201, adjacent to the upper edge 2016 of the basket 201. A wrench 2032 is provided on the outside of the first retaining ring 203, and a cantilever 2033 is provided on the side of the wrench 2032 facing the basket 201. When the first retaining ring 203 is installed on the upper edge 2016 of the basket 201, the cantilever 2033 engages with the third retaining ring 2017, securing the first retaining ring 203 to the basket 201. To remove the first retaining ring 203, simply move the wrench 2032 away from the basket 201 to disengage the cantilever 2033 from the third retaining ring 2017, releasing the first retaining ring 203 from the basket 201.

In some embodiments, the second retaining ring 205 is detachably connected to the body 2042. For example, the side of the second retaining ring 205 facing the body 2042 includes a ring groove, and the inner wall of the ring groove is in an interference fit with the body 2042, securing the second retaining ring 205 to the body 2042. Alternatively, the second retaining ring 205 is directly sleeved on the outer side of the body 2042, and the limiting is achieved by friction or elastic pre-tightening.

In some embodiments, the bottom of the receiving chamber 2011 is provided with four upwardly extending support plates 2018, evenly distributed along the circumference of the bottom. The support plates 2018 elevate the bottom of the filtration cylinder 202, maintaining a certain distance from the bottom of the receiving chamber 2011 and creating a flow-guiding gap.

Figure 13:
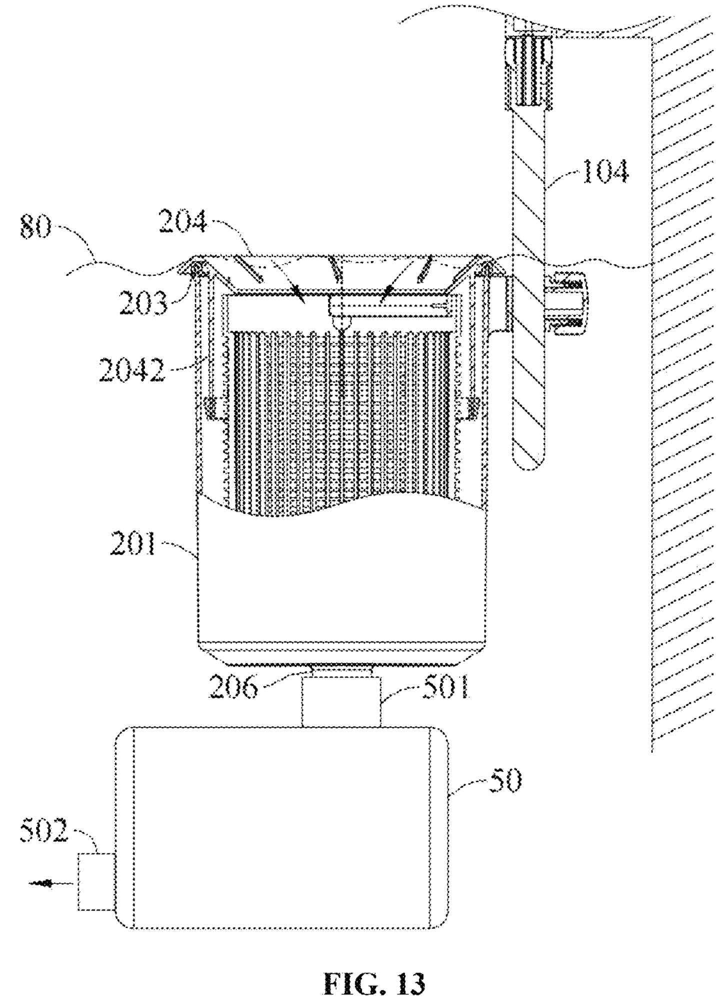
FIG. 13 shows a pool skimmer during use according to some embodiments of the present disclosure.
Figures 14, 15:
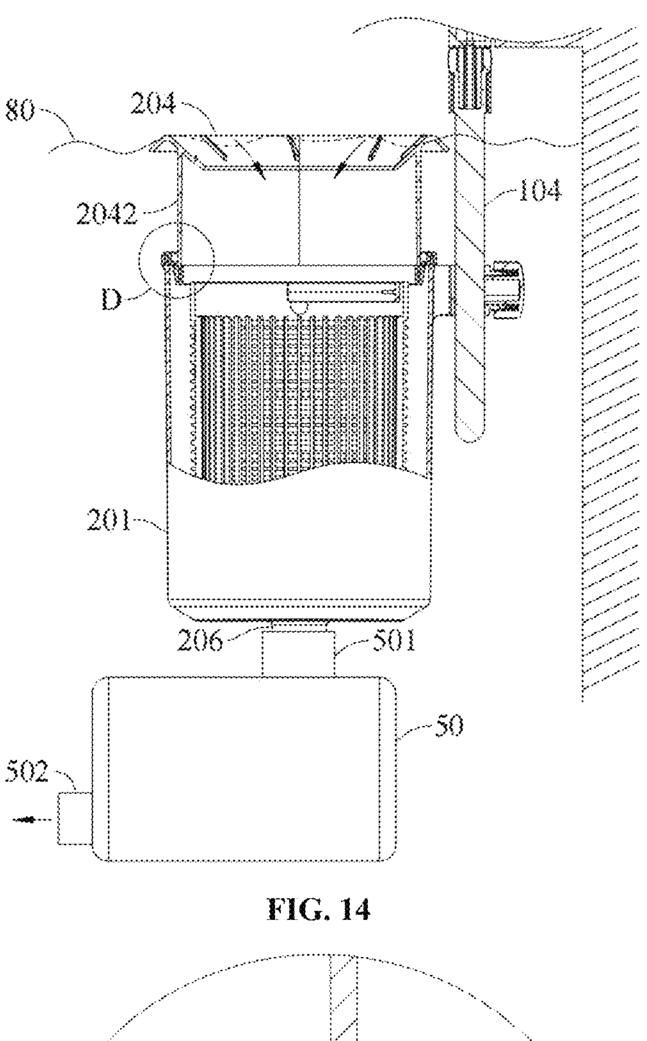
FIG. 14 shows a pool skimmer during use according to some embodiments of the present disclosure.
FIG. 15 is an enlarged partial view of area D in FIG. 14.

As shown in FIGS. 13 and 14, the filter assembly 20 is mostly immersed in the pool water, ensuring that the first end of the inlet pipe 2041 (i.e., the top surface of the float 204) is substantially flush with the water surface 80. In some embodiments, the outlet pipe 206 of the basket 201 is directly connected to the water inlet 501 of the water pump 50. In some embodiments, the outlet pipe 206 at the bottom of the basket 201 can also be connected to the water inlet 501 of the water pump 50 via a water pipe. The present disclosure does not limit the connection means between the outlet pipe 206 and the water pump 50. When the water pump 50 is activated, floating debris on the water surface 80 flows along with the pool water through the inlet pipe 2041 into the receiving chamber 2011 of the basket 201. After being filtered by the filtration cylinder 202, the pool water enters the water pump 50 through the outlet pipe 206 at the bottom of the basket 201. Finally, the pool water is discharged into the swimming pool from the outlet end 502 of the water pump 50, completing a complete filtration cycle.

FIGS. 13 and 14 illustrate the operation of the float 204 at two different water levels. FIG. 13 illustrates the operation at a low water level, where the inlet pipe 2041 of the float 204 is substantially in contact with the top of the first retaining ring 203. FIG. 14 illustrates the operation at a high water level, where the second retaining ring 205 of the float 204 is substantially in contact with the first retaining ring 203. Within this range, the float 204 can float freely with changes in water level, maintaining the first end of the inlet pipe 2041 substantially flush with the water surface 80. Furthermore, the position of the filter assembly 20 on the sliding rod 104 can be adjusted to expand the pool skimmer's applicability. If necessary, the sliding rod 104 can be replaced with a desired length to accommodate a wider range of pool sizes or depths.

In some embodiments, to ensure that as much pool water as possible flowing through the inlet pipe 2041 enters the filtration cylinder, the inner diameter of the second end of the inlet pipe 2041 can be designed to be smaller than or equal to the inner diameter of the opening of the filtration cylinder 202. This dimensionally matched design ensures smooth water flow from the inlet pipe 2041 into the filtration cylinder 202, improving water flow efficiency and impurity capture, and optimizing overall filtration performance.

As shown in FIGS. 8, 10, and 13, in some embodiments, the first end 2041*a* of the inlet pipe 2041 is provided with an outwardly and downwardly extending outer edge 2043, with the surface of the outer edge 2043 smoothly transitioning to the surface of the inlet pipe 2041. The diversion slope formed by the outer edge 2043 helps guide pool water and floating debris on the water surface 80 smoothly into the inlet pipe 2041. Additionally, an annular chamber is formed between the outer edge 2043 and the inlet pipe 2041. This chamber can store some air, providing additional floatancy, which helps maintain the balance and stability of the float 204.

The present disclosure also provides some application scenarios as described below.

Figures 16, 17:
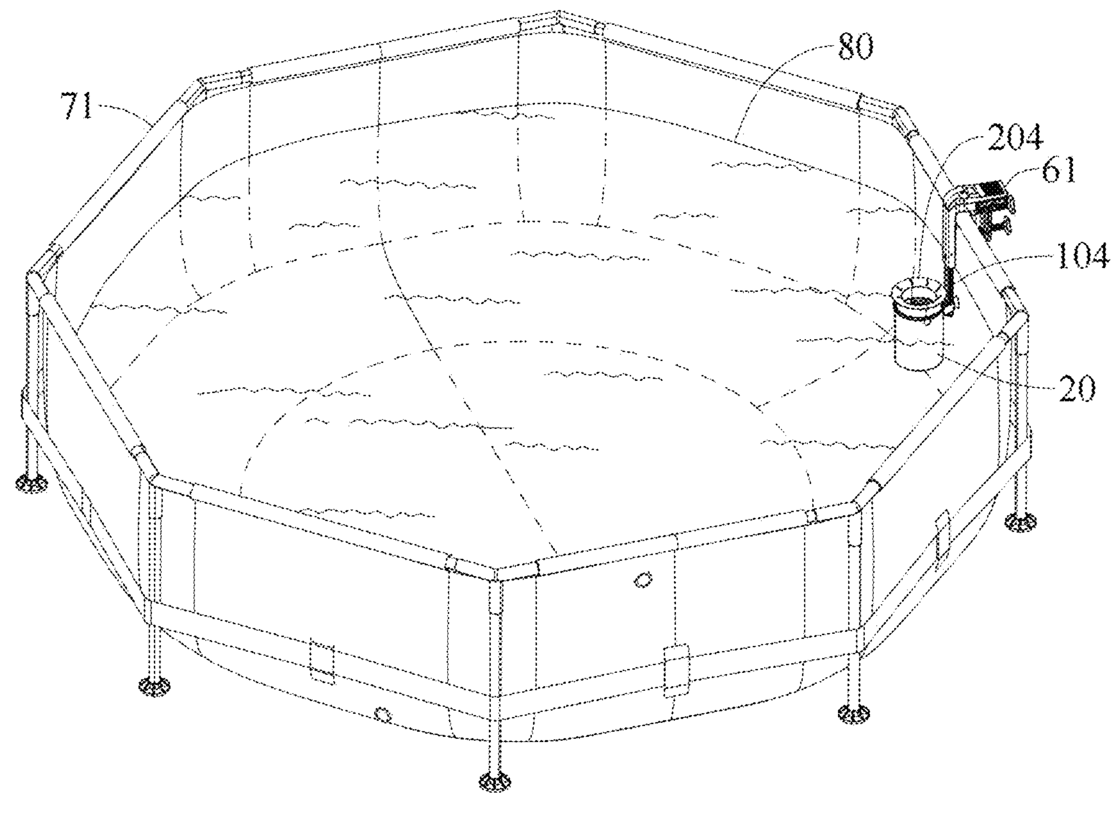
FIGS. 16 and 17 show a pool skimmer being used in a pool stand.

As shown in FIGS. 16 and 17, the pool skimmer 61 of the present disclosure is applied to a pool stand 71. In the present disclosure, the pool skimmer 61 is arranged with a first fixing assembly and is secured to the upper edge of the pool stand 71 via the first fixing assembly. In the scenario of FIG. 16, since the water surface 80 of the pool stand 71 is relatively low, the adjustment function of the present disclosure can be configured to position the filter assembly 20 along the sliding rod 104 to the appropriate position, ensuring that the first end of the inlet pipe 2041 of the float 204 (i.e., the top surface of the float 204) is substantially flush with the water surface 80. In the scenario of FIG. 17, since the water surface 80 of the pool stand 71 is relatively high, the filter assembly 20 can be adjusted upward to a suitable position along the sliding rod 104 through the adjustment function of the present disclosure, and ensure that the first end of the inlet pipe 2041 of the float 204 is basically flush with the water surface 80.

Figures 18, 19:
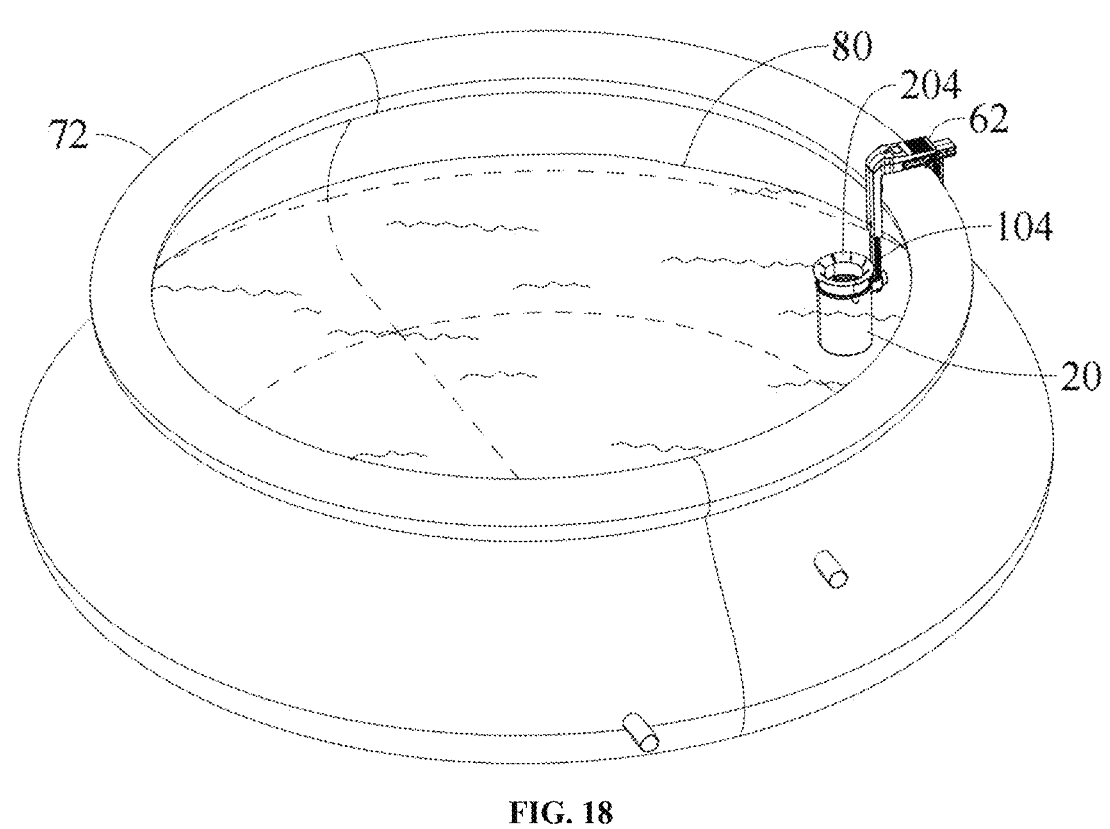
FIGS. 18 and 19 show the pool skimmer being used in an inflatable pool.

As shown in FIGS. 18 and 19, the pool skimmer 62 is applied to an inflatable swimming pool 72. In this application scenario, the pool skimmer 62 is equipped with a second fixing assembly and secured to the upper edge of the inflatable swimming pool 72 via the second fixing assembly. In the scenario of FIG. 18, since the water surface 80 of the inflatable swimming pool 72 is relatively low, the adjustment function of the present application can be used to position the filter assembly 20 along the sliding rod 104 to a corresponding appropriate position, ensuring that the first end of the inlet pipe 2041 of the float 204 (i.e., the top surface of the float 204) is substantially flush with the water surface 80. In the scenario of FIG. 19, since the water surface 80 of the inflatable swimming pool 72 is relatively high, the adjustment function can be used to adjust the filter assembly 20 upward along the sliding rod 104 to a suitable position, ensuring that the first end of the inlet pipe 2041 of the float 204 is substantially flush with the water surface 80.

Compared with the related art, the present disclosure offers the following advantages. First, the pool skimmer of the present disclosure features a pool water temperature detection function and a water temperature display function, allowing users to check the real-time water temperature via the display screen. Additionally, the display screen is arranged with a backlight, making it convenient to view the information on the screen at night or in low-light conditions. Second, the filter assembly has an adjustable position function, enabling it to be adjusted to an appropriate position according to changes in water level. Third, in the float drum of the filter assembly, the inlet pipe is provided with multiple guide strips distributed along the circumferential direction of the pipe. These guide strips are designed to direct the water flowing through the inlet pipe to form a vortex, thereby enhancing the suction force of the filter assembly. Fourth, the pool skimmer includes multiple types of fixing components, allowing suitable fixing methods to be selected based on different pool configurations.

The above descriptions are merely some embodiments of the present disclosure and are not intended to limit the present disclosure. Various modifications and changes may be made to the present disclosure by those skilled in the art. Any modifications, equivalent substitutions, improvements, etc., made within the spirit and principles of the present disclosure shall fall within the scope of protection of the present disclosure.

The invention claimed is:

1. A swimming pool skimmer, comprising a hanging assembly and a filter assembly, wherein the hanging assembly comprises a top portion and a side portion, a first end of the side portion is connected to the top portion, and a second end of the side portion is provided with a sliding rod, the filter assembly is connected to the sliding rod and is configured to be adjusted in position along a longitudinal direction of the sliding rod;

the hanging assembly is provided with a circuit board, a display screen, a battery, and a first temperature sensor; the display screen, the battery, and a first temperature sensor are electrically connected to the circuit board;

the sliding rod has a first end facing away from the side portion, the first temperature sensor is provided at the first end of the sliding rod, and the first temperature sensor is configured to detect a water temperature of a swimming pool;

wherein the filter assembly comprises:

a basket, the basket defining a receiving chamber, a bottom of the basket defining a water outlet, and a first retaining ring being provided at an upper edge of the basket;

a filter being arranged in the receiving chamber; and a float, the float being arranged at a top of the basket, the float comprising an inlet pipe and a body, the body being connected to the basket, the inlet pipe extending into the receiving chamber, and a second retaining ring being provided at an end of the body;

wherein an inner diameter of the first retaining ring is greater than an outer diameter of the body and smaller than an outer diameter of the second retaining ring; the outer diameter of the second retaining ring is smaller than an inner diameter of the receiving chamber; the float is configured to move axially along the basket, and the second retaining ring is restricted by the first retaining ring to retain the float on the basket; and wherein the first retaining ring is detachably connected to the basket.

2. The swimming pool skimmer according to claim 1, wherein a third retaining ring is provided on an outer side of an outer tube, the third retaining ring is adjacent to the upper edge and extending along a circumference of the outer tube;

at least one wrench is provided on an outer side of the first retaining ring, and a cantilever is provided on a side of the at least one wrench facing the outer tube;

the cantilever is engaged with the third retaining ring to restrict the first retaining ring on the outer tube; and the cantilever is configured to be disengaged from the third retaining ring to release the first retaining ring from the outer tube in response to pulling the at least wrench outward.

3. A swimming pool skimmer, comprising a hanging assembly and a filter assembly, wherein the hanging assembly comprises a top portion and a side portion, a first end of the side portion is connected to the top portion, and a second end of the side portion is provided with a sliding rod, the filter assembly is connected to the sliding rod and is configured to be adjusted in position along a longitudinal direction of the sliding rod;

the hanging assembly is provided with a circuit board, a display screen, a battery, and a first temperature sensor;

the display screen, the battery, and a first temperature sensor are electrically connected to the circuit board;

the sliding rod has a first end facing away from the side portion, the first temperature sensor is provided at the first end of the sliding rod, and the first temperature sensor is configured to detect a water temperature of a swimming pool;

wherein the filter assembly comprises:

a basket, the basket defining a receiving chamber, a bottom of the basket defining a water outlet, and a first retaining ring being provided at an upper edge of the basket;

a filter being arranged in the receiving chamber; and a float, the float being arranged at a top of the basket, the float comprising an inlet pipe and a body, the body being connected to the basket, the inlet pipe extending into the receiving chamber, and a second retaining ring being provided at an end of the body;

wherein an inner diameter of the first retaining ring is greater than an outer diameter of the body and smaller than an outer diameter of the second retaining ring; the outer diameter of the second retaining ring is smaller than an inner diameter of the receiving chamber; the float is configured to move axially along the basket, and the second retaining ring is restricted by the first retaining ring to retain the float on the basket;

wherein the second retaining ring is detachably connected to the body.

* * * * *